United States Patent
Bofferding et al.

(10) Patent No.: US 9,870,223 B2
(45) Date of Patent: Jan. 16, 2018

(54) EFFICIENT DETECTION OF ARCHITECTURE RELATED ISSUES DURING THE PORTING PROCESS

(71) Applicant: International Business Machines Corporation, Armonk, NY (US)

(72) Inventors: Nicholas E. Bofferding, Cedar Park, TX (US); Andrew J. Geissler, Pflugerville, TX (US); Michael C. Hollinger, Round Rock, TX (US); Ted M. Pacyga, Arlington Heights, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/990,576

(22) Filed: Jan. 7, 2016

(65) Prior Publication Data
US 2017/0199737 A1    Jul. 13, 2017

(51) Int. Cl.
G06F 9/44     (2006.01)
G06F 11/36    (2006.01)

(52) U.S. Cl.
CPC .......... G06F 8/76 (2013.01); G06F 8/36 (2013.01); G06F 8/71 (2013.01); G06F 11/3692 (2013.01)

(58) Field of Classification Search
CPC ........................................................ G06F 8/34
See application file for complete search history.

(56) References Cited

U.S. PATENT DOCUMENTS

| 5,613,098 A | 3/1997 | Landau et al. | |
| 2011/0035726 A1* | 2/2011 | Davies | G06F 8/71 717/110 |
| 2014/0040871 A1* | 2/2014 | Schwan | G06F 8/71 717/141 |
| 2014/0149966 A1* | 5/2014 | Binjrajka | G06F 8/72 717/121 |
| 2014/0215446 A1 | 7/2014 | Araya et al. | |
| 2014/0380280 A1 | 12/2014 | Millwood | |

OTHER PUBLICATIONS

Anonymously; "System for Ranking Test Case Unexpected Results"; An IP.com Prior Art Database Technical Disclosure; http://ip.com/IPCOM/000237172; Jun. 6, 2014, 5 pages.

(Continued)

*Primary Examiner* — Hang Pan
(74) *Attorney, Agent, or Firm* — Patterson + Sheridan, LLP

(57) ABSTRACT

Systems, methods, and computer program products to perform an operation comprising identifying a first commit of a plurality of commits for a software project, wherein a source code of the first commit is executable in a first system architecture, computing a score for each commit in a first set of the plurality of commits, wherein each score reflects a likelihood of success in porting the source code of the respective commit from the first system architecture to a second system architecture, wherein a version of each commit in the first set of commits is between a version of the first commit and a current version of the software project, identifying one or more of the first set of commits based on the scores for each commit, and building the source code of the one or more of the first set of commits for execution on the second system architecture.

17 Claims, 6 Drawing Sheets

(56) References Cited

OTHER PUBLICATIONS

Anonymously; "A Mechanism for the Analysis of ESB Flows to Achieve ESB Artefact Cross Platform Portability"; An IP.com Prior Art Database Technical Disclosure; http://ip.com/IPCOM/000227020; May 1, 2013; 5 pages.

Jenkins Wiki; "Build Failure Analyzer", retrieved Nov. 3, 2015, 7 pages, https://wiki.jenkins-ci.org/display/JENKINS/Build+Failure+Analyzer.

Jenkins Wiki; "Meet Jenkins", retrieved Nov. 3, 2015, 3 pages, https://wiki.jenkins-ci.org/display/JENKINS/Meet+Jenkins.

\* cited by examiner

CONSIDER THE FOLLOWING PROBLEM AREAS IN code.cpp:

120 ...
121 mov %eax, %ebx
122 ...

501

SAVE   CANCEL

PREV   NEXT

EFFICIENT DETECTION OF ARCHITECTURE RELATED ISSUES DURING THE PORTING PROCESS

BACKGROUND

The present disclosure relates to computer software, and more specifically, to computer software which efficiently detects architecture-related bugs during the porting process.

Software projects are typically developed for a specific system architecture, such as x86, Power, or other platforms. The software project may be stored in a source code repository, and may be updated by developers using "commits," which add the latest changes to the code to the repository. However, porting software projects to a new architecture is not as simple as a "copy and paste" operation. When building a software project on a new architecture for the first time, certain types of well-characterized failures often occur. Users must make changes to the current version or remove error-causing commits such that the software builds successfully on the target architecture. This process is error-prone, manual, and is not a "cookie cutter" process. Identifying certain classes of errors or code styles (e.g. architecture checks for x86, inline assembly, and environment-specific build options) may each cause different types of errors. Developers need a more efficient way to port software projects from a source architecture to a target architecture.

SUMMARY

Embodiments disclosed herein include systems, methods, and computer program products to perform an operation comprising identifying a first commit of a plurality of commits for a software project, wherein a source code of the first commit is executable in a first system architecture, computing a score for each commit in a first set of the plurality of commits, wherein each score reflects a likelihood of success in porting the source code of the respective commit from the first system architecture to a second system architecture, wherein a version of each commit in the first set of commits is between a version of the first commit and a current version of the software project, identifying one or more of the first set of commits based on the scores for each commit, and building the source code of the one or more of the first set of commits for execution on the second system architecture.

BRIEF DESCRIPTION OF THE SEVERAL VIEWS OF THE DRAWINGS

FIG. 5 illustrates a graphical user interface configured to provide efficient detection of architecture-related bugs during the porting process, according to one embodiment.

DETAILED DESCRIPTION

Embodiments disclosed herein provide tools to help developers efficiently port an existing software package to a target architecture, while minimizing how many lines of code developers must examine by hand. Generally, embodiments disclosed herein piece together source code commits to build a target package that is as close to the software package originally used to build a software package for a source architecture (e.g., the current working version on the source architecture) and present remaining segments of code for manual review. More specifically, embodiments disclosed herein may identify a base working commit on the existing architecture and iterate through the remaining commits between the base commit and the commit corresponding to the current working version, scoring each remaining commit based on ease of portability to the target architecture. Embodiments disclosed herein may then patch together the easiest to port commits, and build the patched commits on the target architecture. After the build process completes, embodiments disclosed herein may output notifications to users which indicate the commits that were excluded, failed to build, or otherwise encountered errors, and may highlight potential problems in the source code for review.

Figure 1:
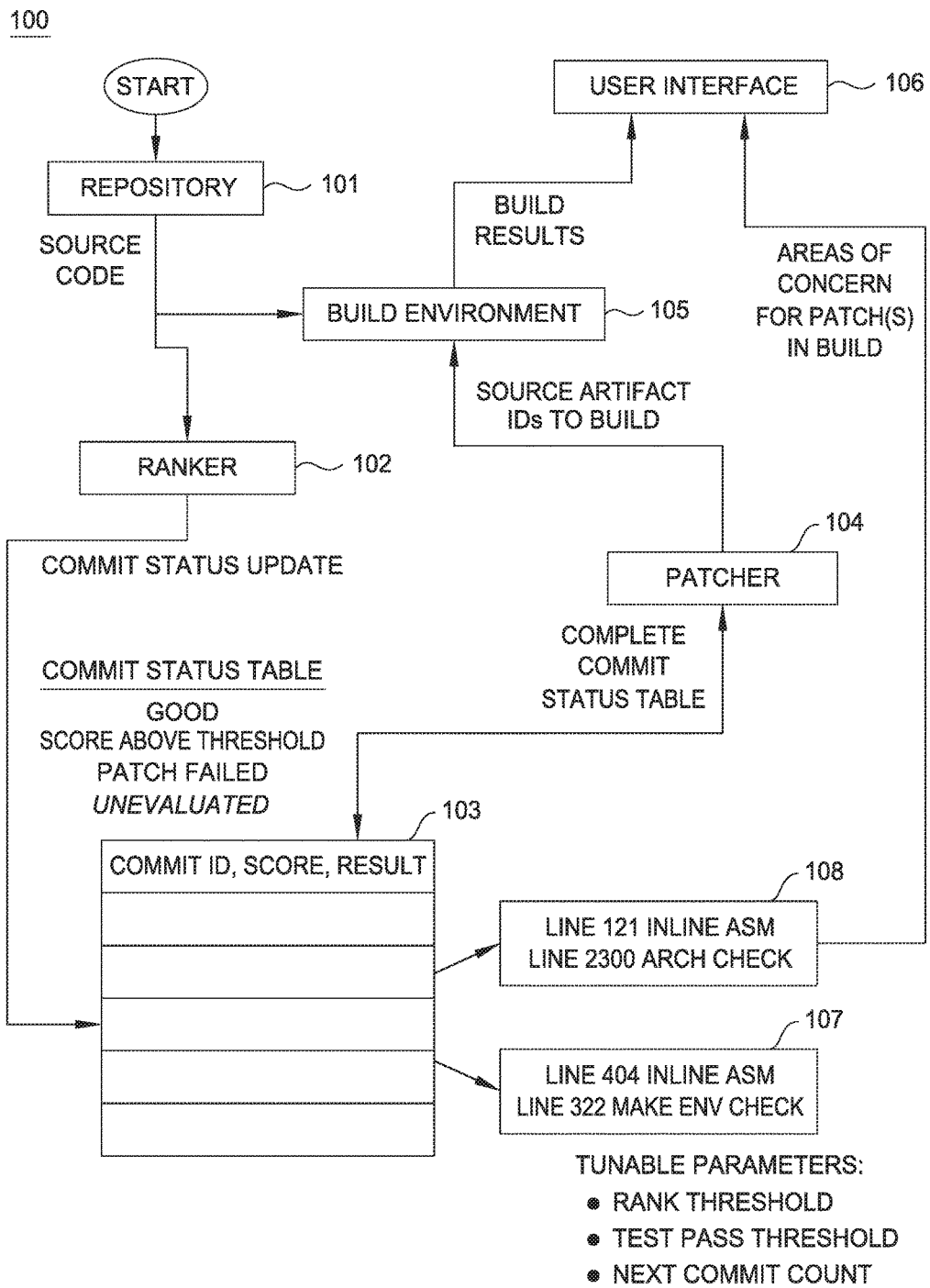
FIG. 1 illustrates an architecture configured to provide efficient detection of architecture-related bugs during the porting process, according to one embodiment.

FIG. 1 illustrates an architecture 100 configured to provide efficient detection of architecture-related bugs during the porting process, according to one embodiment. As shown, the architecture 100 includes a source code repository 101, a ranker 102, a commit status table 103, a patcher 104, a build environment 105, and a user interface 106. The source code repository 101 is a platform configured to store and manage the source code of any number and type of software projects. Example source code repositories include Github® and SourceForge®. In at least one embodiment, the source code repository 101 also provides version control (also referred to revision control) functionality, which may include using "commits" to add the latest changes to the source code to the repository 101. For example, the source code for a web page may include a form to log in to a user account. A developer may update the source code of the form to include password restrictions (such as password length, etc.). When the developer is finished with the code that implements the password restrictions, the developer may "commit" the updated source code to the repository 101, where the changes are indefinitely stored (until deleted or otherwise updated). Therefore, when the source code for the web page is subsequently built, the password restriction functionality in the commit will be incorporated into the web page.

The ranker 102 is a component configured to score commits in the source code repository 101. Generally, the ranker 102 consumes the source code of a commit, computes a score for the commit, and creates an entry in the commit status table 103 for the commit. Generally, the ranker 102 may consider a plurality of different factors that may reflect a relative ease or difficulty in porting the commit to a different platform. For example, and without limitation, the ranker 102 may consider the following attributes of the source code that may result in invalid architecture errors in the porting process: new build options, configuration changes, system calls, language-specific native code, commit log comments, libraries and/or modules that are well-known to call "native" code (e.g. JNI in java), bash/build architecture checks (e.g. uname), endianness, math operations, and logical operations. The ranker 102 may use any suitable algorithm to compute a numerical score for the commits. One example algorithm for computing the score is as follows: Score=N×(number of new build options)+C× (number of configuration changes found)+S×(number of system calls)+L×(number of occurrences of language-specific native code)+G×(number of commit log comments)+ M×(number of native code calling modules)+A×(number of architecture checks)+E×(number of endianness/math/logical operations). A user may tune the weights of the algorithm to emphasize some attributes over others.

The commit status table 103 includes metadata for each commit in the source code repository 101. The metadata may include a commit identifier (ID), the score generated by the ranker 102, a status of the commit, and an indication of bad code segments from the ranker 102. The status of the commit may include different statuses related to the patch process, such as "patched", "ready to patch," or "patch failed." Generally, a "patch" refers to a set of commits. Initially, all items may be labeled as "ready to patch." The build environment 105 may update the entries in the commit status table 103 based on whether the commit is successfully patched with other commits ("patched" or "patch failed"). If the status of a commit is "patch failed," the user may be able to make modifications to the code for the commit, and update the commit status table 103 to "patch ready" for the commit. The bad code segments may include problem segments of code identified by the ranker 102 when computing the score. Blocks 107-108 include example indications of bad code segments that are stored as records in the commit status table 103 and may be outputted to a user via the user interface 106.

The patcher 104 may consume the commit status table 103 and produce a set of commit IDs (a patch) that can be grouped together for building by the build environment 105 based on the status of the commits in the commit status table 103. In at least one embodiment, the patcher 104 selects commits by identifying a base working commit for the source architecture, and adding commits that are between the base working commit and the most current version of the software project. The patcher 104 may add commits based on the score for the commit in the commit status table 103, thereby adding commits that are more likely to successfully build.

The build environment 105 is a platform that builds and tests source code from the source code repository 101. The build environment 105 is configured to build software projects for different operating systems and system architectures. An example of a build environment includes the Jenkins continuous integration server. Generally, a system architecture may refer to a microprocessor's instruction set architecture (ISA), which defines the available features of a particular microprocessor, including its machine language and operating modes. An example of a system architecture includes the Power Instruction Set Architecture. As shown in FIG. 1, the build environment 105 consumes a set of commit IDs from the patcher 104 and the corresponding source code from the repository 101. The build environment 105 then attempts to build the source code, and updates the commit status table 103 entry for each commit based on whether the build was successful.

The user interface 106 is representative of a variety of user interfaces. The user interfaces 106 may include an interface to request to port an existing software project to a different platform, triggering the work flow described herein. Additionally, the user interfaces 106 may display areas of concern for the patches in a given build in the port process. For example, the user interfaces 106 may output the "bad code" of blocks 107, 108, allowing the user to edit the source code of the relevant commit, and update the commit status table 103 to "ready to patch" for the commit. In at least one embodiment, the code of blocks 107 or 108 may be selected based on the score in the commit status table 103.

Figure 2:
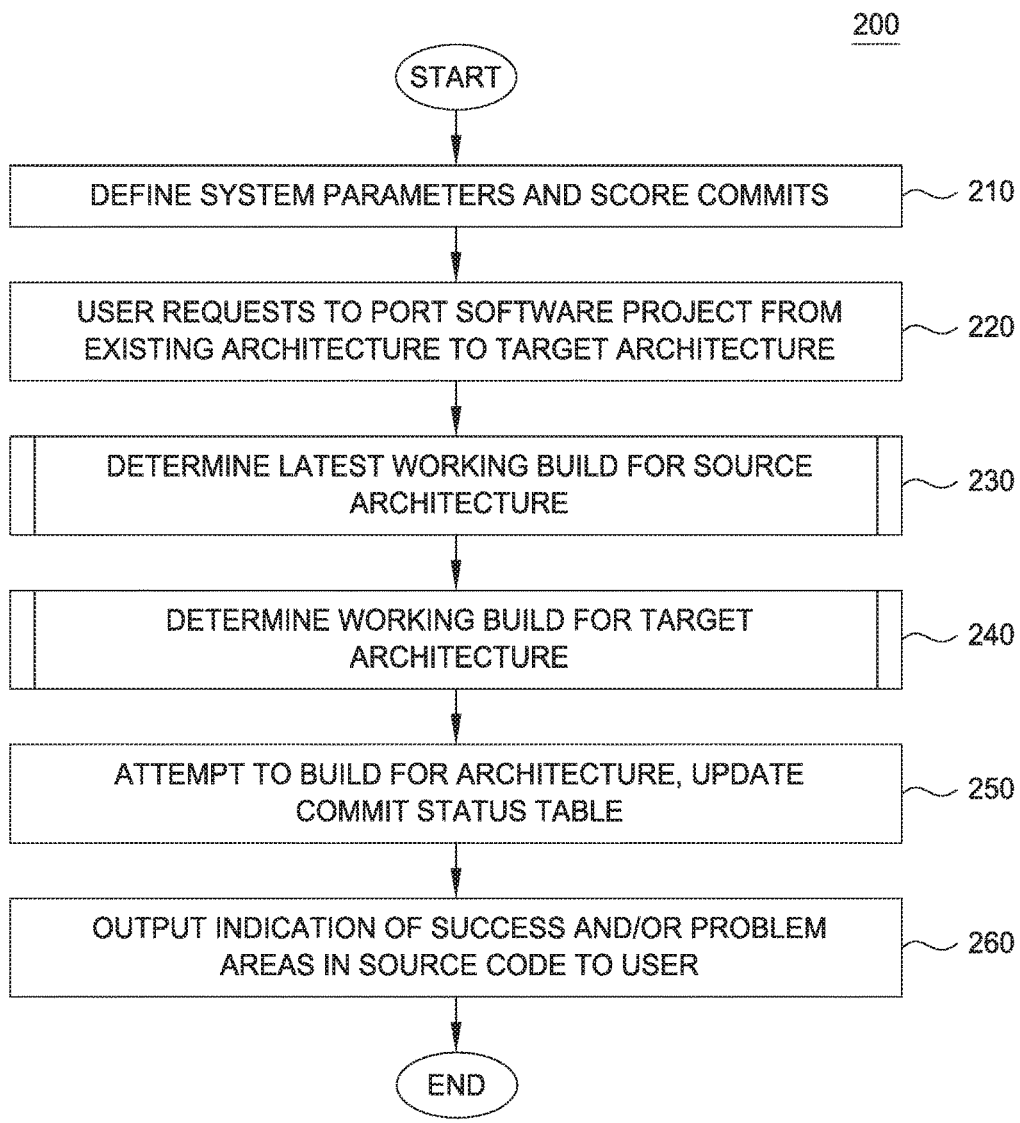
FIG. 2 is a flow chart illustrating a method to provide efficient detection of architecture-related bugs during the porting process, according to one embodiment.

FIG. 2 is a flow chart illustrating a method 200 to provide efficient detection of architecture-related bugs during the porting process, according to one embodiment. Generally, the method 200 attempts to generate a working build of a software project for porting to a different system architecture. In doing so, the method 200 may identify short segments of problematic code that can be presented to users, rather than requiring the users to sift through possibly millions of lines of code to determine where the errors originated.

As shown, the method 200 begins at block 210, where a user may optionally define system parameters. The configurable parameters include a patch threshold value for whether a commit should be included in a patch, a test threshold value indicating a maximum number of errors a build can experience, and a commit search granularity. The commit search granularity may be used to affect the rate by which the system processes a source repository. For example, if the commit search granularity is "1," then each and every commit in the source repository is searched. Similarly, if the granularity is "100," then groups of 100 commits may be searched. In addition, at block 210, the ranker 102 may score each commit as described above. At block 220, a user may issue a request to port a software project from an existing architecture to a target architecture. The architectures may be different ISAs, operating systems, hardware platforms (such as different processors), or any combination thereof. At block 230, described in greater detail with reference to FIG. 3, the system may determine the latest working build for the software project. At block 240, described in greater detail with reference to FIG. 4, the system may determine the latest working build for the target architecture. The latest working build for the target architecture may be a set of commits (a patch) identified by the patcher 104. In at least one embodiment, the patch is a group of commits that is between a base build and the latest working build of the source platform. At block 250, the system may attempt to build the latest working build for the target architecture and update the commit status table 103 according to the results of the build and test process. At block 260, the system may output an indication of success of the build to the user. The system may also output problem areas of the source code to the user for review.

Figure 3:
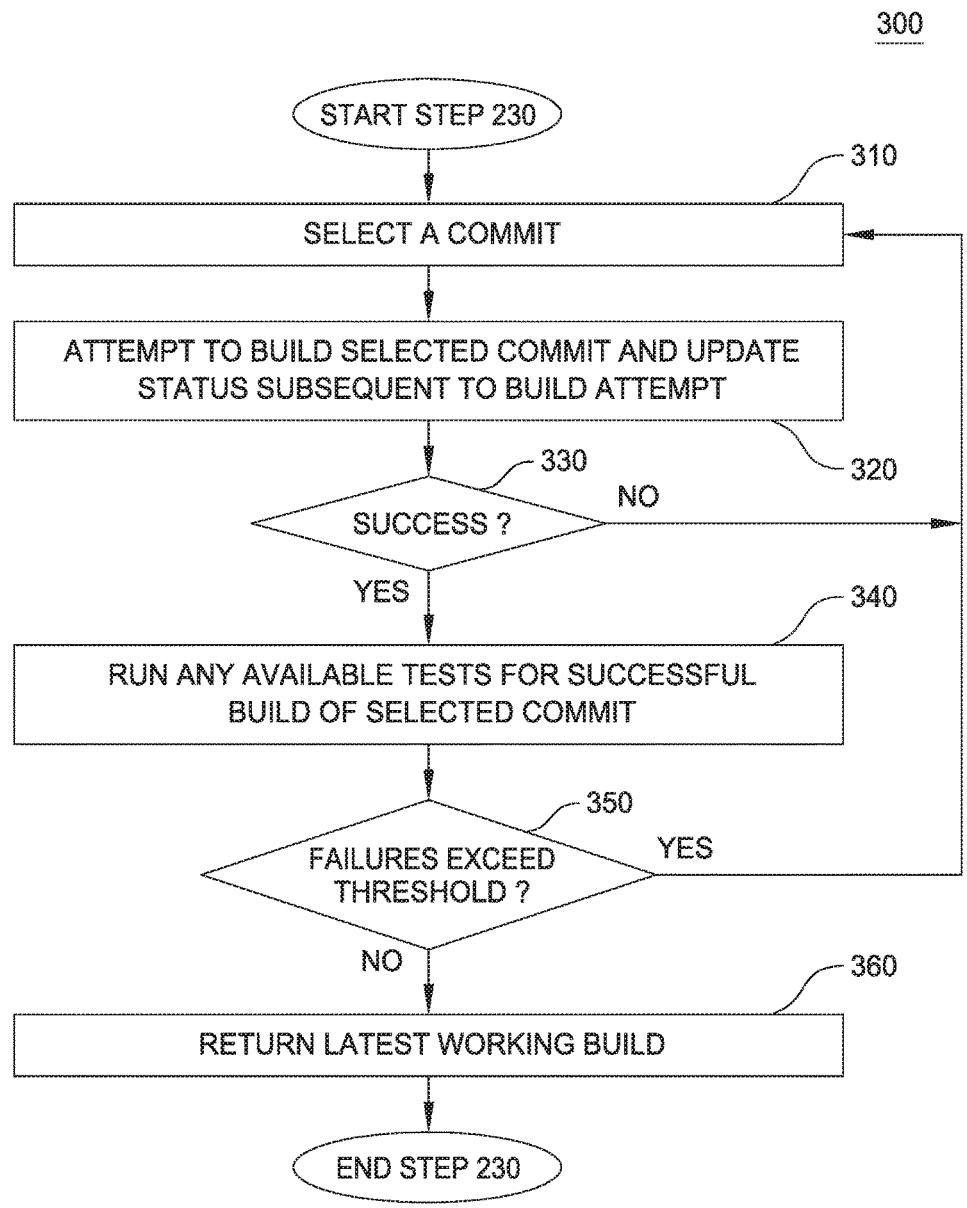
FIG. 3 is a flow chart illustrating a method to determine a latest working build for a source architecture, according to one embodiment.

FIG. 3 is a flow chart illustrating a method 300 corresponding to block 230 to determine a latest working build for a source architecture, according to one embodiment. As shown, the method 300 begins at block 310, where the system selects a commit for the software project in the source code repository 101. In the first iteration of block 230, the system may select the commit corresponding to the most current version of the source code. However, in subsequent iterations, the system may use a search algorithm, such as a binary search, to identify prior commits for processing. At block 320, the system may pass the selected commit to the build environment 105, which may attempt to build the commit, and update the status of the build attempt in the build status table. At block 330, the system may determine whether the build attempt was successful. If the build attempt was not successful, the commit is not a working commit for the target platform, and the method returns to block 310 to select another commit. If the build is successful, the method proceeds to block 340, where the build environment 105 may run a set of available tests for the successful build. At block 350, the system may determine whether a count of the number of failures incurred while testing the build exceeds the failure threshold. If the number of failures exceeds the failure threshold, the method returns to block 310 to select another build. If the number of failures does not exceed the threshold, the current commit is returned as the latest working build. Note that the commit corresponding to the most recent version of the source code or a commit corresponding to a prior version of the source code may be returned at block 360.

Figure 4:
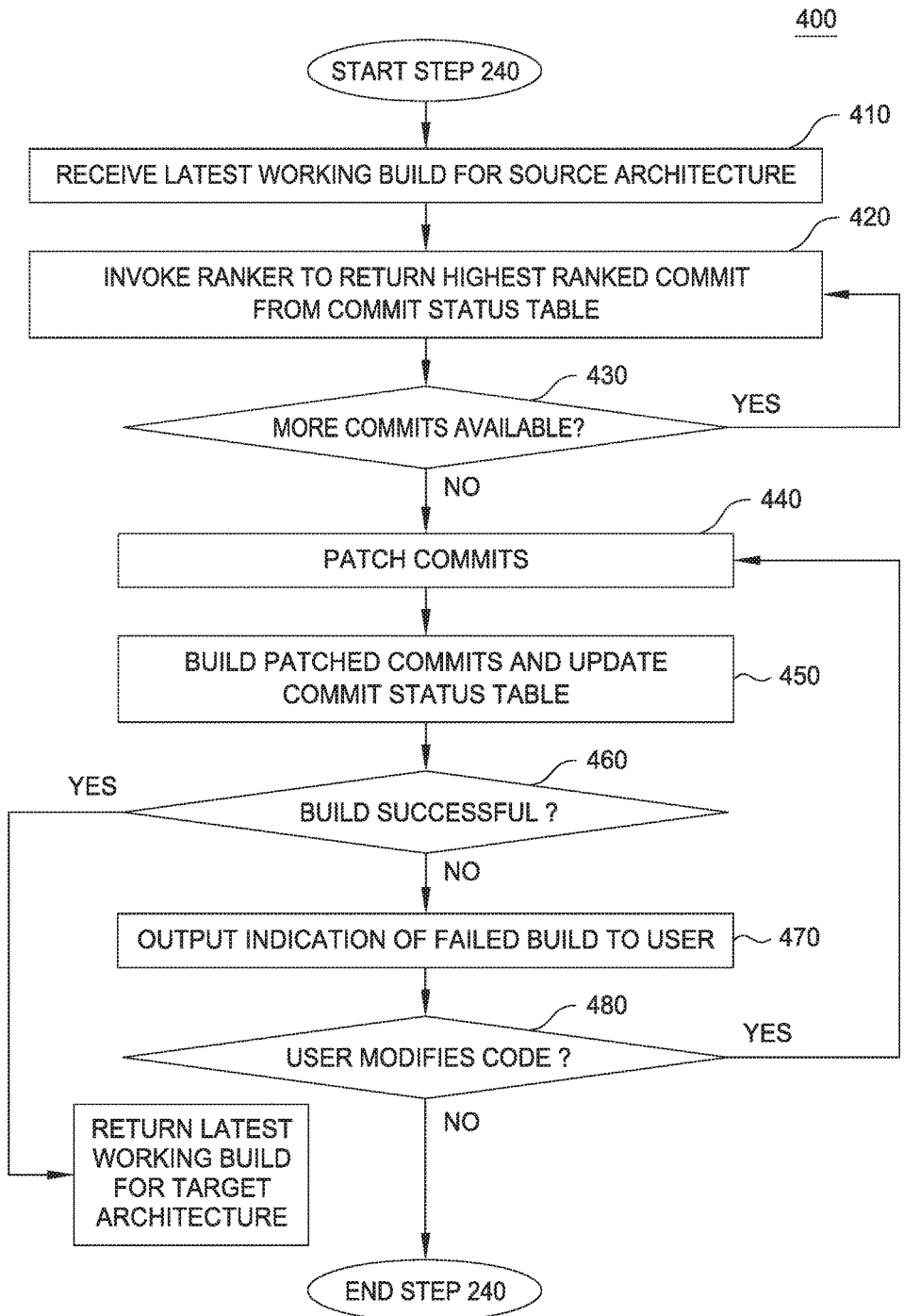
FIG. 4 is a flow chart illustrating a method to determine a latest working build for a target architecture, according to one embodiment.

FIG. 4 is a flow chart illustrating a method 400 corresponding to block 240 to determine a latest working build for a target architecture, according to one embodiment. As shown, the method 400 begins at block 410, where the system receives the latest working build for the source architecture determined at block 360. At block 420, the system may invoke the ranker 104, which returns the highest ranked commit from the commit status table. In at least one embodiment, the ranker may determine whether the highest ranked commit has a score that exceeds the rank threshold exist before returning the commit. At block 430, the system may determine whether more commits between the latest working build and the most current version of the software are available. If more commits are available, the method returns to block 420, where the next highest ranking commit is returned from the commit status table. If no more commits are available (or no more commits exist that have a score above the rank threshold), the method proceeds to block 440, where the patcher 104 patches the commit IDs corresponding to the commits returned at block 420. At block 450, the build environment 105 attempts to build the source code corresponding to the patched commit identifiers provided by the patcher 105. The build environment 105 may also update the commit status table 103 for each commit that was part of the patch. At block 460, the build environment 105 determines whether the build attempt was successful. If the build attempt was successful, the method proceeds to block 490. If the build was not successful, the method proceeds to block 470, where the user interface 106 may output an indication of the failed build to the user. The indication of the failed build may also include one or more portions of source code that caused failures, errors, or other issues in the build process. At block 480, the system determines whether the user modifies the source code presented to the user at block 470. If the user modifies the source code, the method returns to block 440, where the patch/build process is attempted once again. If the user does not modify the source code, the user has the option to exit and the method 400 ends. Returning to block 460, if the build was successful, the method proceeds to block 490, where the system may return the build as the latest working build for the target architecture.

FIG. 5 illustrates a graphical user interface (GUI) 500 configured to provide efficient detection of architecture-related bugs during the porting process, according to one embodiment. The GUI 500 may correspond to a GUI 106 from FIG. 1. As shown, the GUI 500 provides an editor 501 that pinpoints specific errors found in code in the repository 101. As shown, the editor 501 outputs to the user the lines of code that may have caused errors in the porting process from one platform to another. Specifically, the editor 501 includes an example inline assembly instruction that may correspond to the output of block 108 in FIG. 1. As shown, the editor 501 pinpoints the errors in the code that a developer would otherwise have to manually identify. The editor 501 also allows the developer to modify the code to eliminate the errors. If the developer modifies the code, the editor 501 allows the user to save the code. The developer also has the option to scroll through different errors in different files, saving time and effort for the developer who would otherwise have to search for the proverbial needle in the haystack to identify lines of code that are causing errors during the porting process. If the developer modifies code, then the changes would form a new commit in the source repository, and a new entry in the commit status table.

Figure 6:
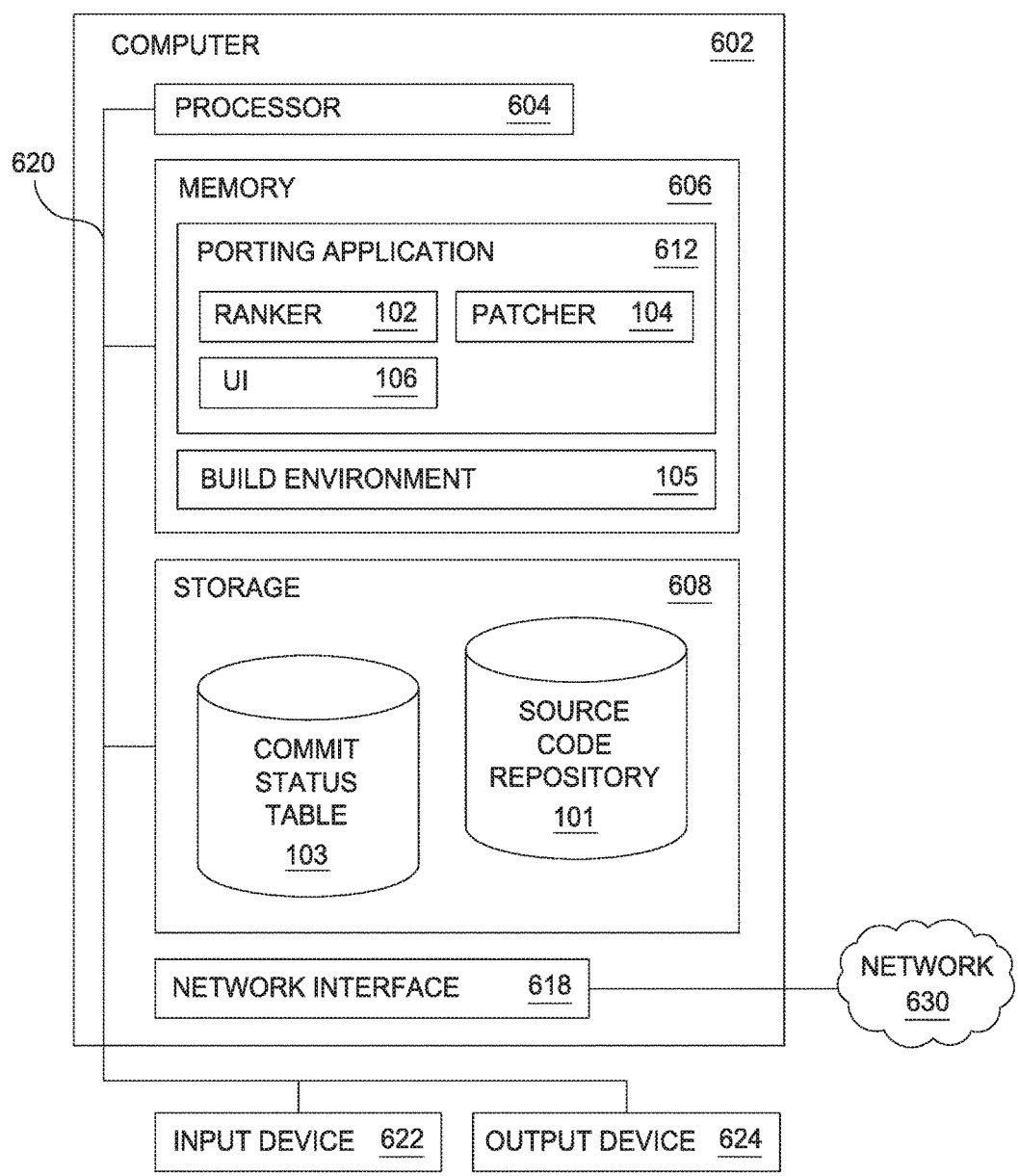
FIG. 6 illustrates a system configured to provide efficient detection of architecture-related bugs during the porting process, according to one embodiment.

FIG. 6 illustrates a system configured to provide efficient detection of architecture-related bugs during the porting process, according to one embodiment. The networked system 600 includes a computer 602. The computer 602 may also be connected to other computers via a network 630. In general, the network 630 may be a telecommunications network and/or a wide area network (WAN). In a particular embodiment, the network 630 is the Internet.

The computer 602 generally includes a processor 604 which obtains instructions and data via a bus 620 from a memory 606 and/or a storage 608. The computer 602 may also include one or more network interface devices 618, input devices 622, and output devices 624 connected to the bus 620. The computer 602 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

As shown, the memory 606 contains the porting application 612 and the build environment 105. The porting application is configured to orchestrate the porting of source code from one architecture to a different architecture. As shown, the porting application 612 includes the ranker 102, the patcher 104, and the user interfaces 106. In at least one embodiment, the ranker 102, the patcher 104, and the user interfaces 106 are external to the porting application 612. As shown, the storage 608 includes the source code repository 101 and the commit status table 103. Generally, the computer 602 is configured to implement all systems, methods, and functionality described herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the porting application 612 could execute on a computing system in the cloud and port software packages from a source environment to a target environment. In such a case, the porting application 612 could build a target package and store the target package at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    identifying, by operation of a computer processor based on a search granularity, a source code of a first commit of a plurality of commits for a software project;
    successfully building the source code of the first commit for a first system architecture and a second system architecture;
    determining, based on a set of tests run against the built source code of the first commit for the first and second system architectures, that the first commit is a latest working build for the first and second system architectures, wherein a respective number of failures incurred by running the set of tests does not exceed a failure threshold;
    computing a score for each commit in a first set of the plurality of commits, wherein each score reflects a likelihood of success in porting the source code of the respective commit from the first system architecture to the second system architecture, wherein a version of each commit in the first set of commits is between a version of the first commit and a current version of the software project, wherein a commit status table stores, for each commit in the first set of commits: (i) the score, and (ii) a portion of the source code of the commit;
    identifying a second commit of the first set of commits based on the scores for each commit;
    patching the source code of the first commit and the source code of the second commit;
    building the patched source code of the first and second commits for execution on the second system architecture;
    determining that the patched source code did not build successfully for execution on the second system architecture based on an error at a first line of the patched source code; and
    outputting for display: (i) an indication that the patched source code did not build successfully, and (ii) the first line of the patched source code.

2. The method of claim 1, further comprising:
    prior to identifying the first commit, receiving a request to port the software project from the first system architecture to the second system architecture; and
    subsequent to determining that the patched source code did not build successfully, storing an indication that the patched source code did not build successfully.

3. The method of claim 2, wherein each score is computed based on at least one attribute of the source code of each commit, wherein the score is reduced upon detecting, in respective instances, the presence of each of the attributes comprising: (i) a system call in the source code, (ii) a configuration change to the source code, (iii) a build option, (iv) whether the source code is specific to the first system architecture, and (v) whether the source code is known to call native code in the first system architecture, wherein the score is increased upon detecting, in respective instances, each of the attributes comprising: (i) whether the source code is specific to the second system architecture, and (ii) whether the source code is known to call native code in the second system architecture.

4. The method of claim 3, wherein the source code of the first commit is identified in a source code repository, the method further comprising:
- running the set of tests on the builds of the source code of the first commit for the first and second system architectures; and
- determining that the respective numbers of failures incurred by running the set of tests does not exceed a failure threshold.

5. The method of claim 4, wherein the first system architecture is different from the second system architecture, wherein the second commit is identified based on determining the score of the second commit exceeds a rank threshold.

6. The method of claim 5, wherein the commit status table further stores, for each commit in the first set of commits: (i) a respective commit identifier, and (ii) an indication of a respective status of the commit.

7. A system, comprising:
- one or more processors; and
- a memory containing a program, which when executed by the processors, performs an operation comprising:
  - identifying, based on a search granularity, a source code of a first commit of a plurality of commits for a software project;
  - successfully building the source code of the first commit for a first system architecture and a second system architecture;
  - determining, based on a set of tests run against the built source code of the first commit for the first and second system architectures, that the first commit is a latest working build for the first and second system architectures, wherein a respective number of failures incurred by running the set of tests does not exceed a failure threshold;
  - computing a score for each commit in a first set of the plurality of commits, wherein each score reflects a likelihood of success in porting the source code of the respective commit from the first system architecture to the second system architecture, wherein a version of each commit in the first set of commits is between a version of the first commit and a current version of the software project, wherein a commit status table stores, for each commit in the first set of commits: (i) the score, and (ii) a portion of the source code of the commit;
  - identifying a second commit of the first set of commits based on the scores for each commit;
  - patching the source code of the first commit and the source code of the second commit;
  - building the patched source code of the first and second commits for execution on the second system architecture;
  - determining that the patched source code did not build successfully for execution on the second system architecture based on an error at a first line of the patched source code; and
  - outputting for display: (i) an indication that the patched source code did not build successfully, and (ii) the first line of the patched source code.

8. The system of claim 7, the operation further comprising:
- prior to identifying the first commit, receiving a request to port the software project from the first system architecture to the second system architecture; and
- subsequent to determining that the patched source code did not build successfully, storing an indication that the patched source code did not build successfully.

9. The system of claim 8, wherein each score is computed based on at least one attribute of the source code of each commit, wherein the score is reduced upon detecting, in respective instances, the presence of each of the attributes comprising: (i) a system call in the source code, (ii) a configuration change to the source code, (iii) a build option, (iv) whether the source code is specific to the first system architecture, and (v) whether the source code is known to call native code in the first system architecture, wherein the score is increased upon detecting, in respective instances, each of the attributes comprising: (i) whether the source code is specific to the second system architecture, and (ii) whether the source code is known to call native code in the second system architecture.

10. The system of claim 9, wherein the source code of the first commit is identified in a source code repository, the operation further comprising:
- running the set of tests on the builds of the source code of the first commit for the first and second system architectures; and
- determining that the respective numbers of failures incurred by running the set of tests does not exceed a failure threshold.

11. The system of claim 10, wherein the first system architecture is different from the second system architecture, wherein the second commit is identified based on determining the score of the second commit exceeds a rank threshold.

12. The system of claim 11, wherein the commit status table further stores, for each commit in the first set of commits: (i) a respective commit identifier, and (ii) an indication of a respective status of the commit.

13. A computer program product, comprising:
- a non-transitory computer-readable storage medium having computer-readable program code embodied therewith, the computer-readable program code executable by one or more computer processors to perform an operation comprising:
  - identifying, based on a search granularity, a source code of a first commit of a plurality of commits for a software project;
  - successfully building the source code of the first commit for a first system architecture and a second system architecture;
  - determining, based on a set of tests run against the built source code of the first commit for the first and second system architectures, that the first commit is a latest working build for the first and second system architectures, wherein a respective number of failures incurred by running the set of tests does not exceed a failure threshold;
  - computing a score for each commit in a first set of the plurality of commits, wherein each score reflects a likelihood of success in porting the source code of the respective commit from the first system architecture to the second system architecture, wherein a version of each commit in the first set of commits is between a version of the first commit and a current version of the software project, wherein a commit status table stores, for each commit in the first set of commits: (i) the score, and (ii) a portion of the source code of the commit;
  - identifying a second commit of the first set of commits based on the scores for each commit;
  - patching the source code of the first commit and the source code of the second commit;

building the patched source code of the first and second commits for execution on the second system architecture;

determining that the patched source code did not build successfully for execution on the second system architecture based on an error at a first line of the patched source code; and outputting for display: (i) an indication that the patched source code did not build successfully, and (ii) the first line of the patched source code.

14. The computer program product of claim 13, the operation further comprising:

prior to identifying the first commit, receiving a request to port the software project from the first system architecture to the second system architecture; and subsequent to determining that the patched source code did not build successfully, storing an indication that the patched source code did not build successfully.

15. The computer program product of claim 14, wherein each score is computed based on at least one attribute of the source code of each commit, wherein the score is reduced upon detecting, in respective instances, the presence of each of the attributes comprising: (i) a system call in the source code, (ii) a configuration change to the source code, (iii) a build option, (iv) whether the source code is specific to the first system architecture, and (v) whether the source code is known to call native code in the first system architecture, wherein the score is increased upon detecting, in respective instances, each of the attributes comprising: (i) whether the source code is specific to the second system architecture, and (ii) whether the source code is known to call native code in the second system architecture.

16. The computer program product of claim 15, wherein the source code of the first commit is identified in a source code repository, the operation further comprising:

running the set of tests on the builds of the source code of the first commit for the first and second system architectures; and determining that the respective numbers of failures incurred by running the set of tests does not exceed a failure threshold.

17. The computer program product of claim 16, wherein the first system architecture is different from the second system architecture, wherein the second commit is identified based on determining the score of the second commit exceeds a rank threshold, wherein the commit status table further stores, for each commit in the first set of commits: (i) a respective commit identifier, and (ii) an indication of a respective status of the commit.

* * * * *